Feb. 20, 1962   A. FERRANTI   3,022,433
MOTOR-FLYWHEEL UNIT
Filed May 3, 1956   2 Sheets-Sheet 1

INVENTOR.
Albino Ferranti
BY

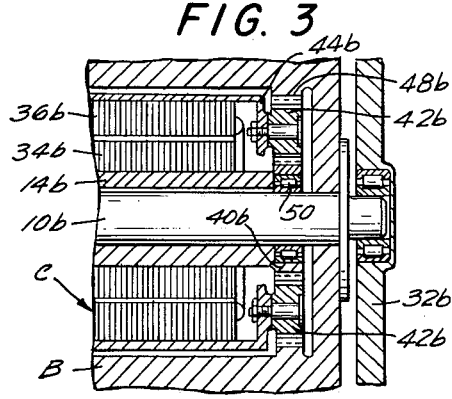
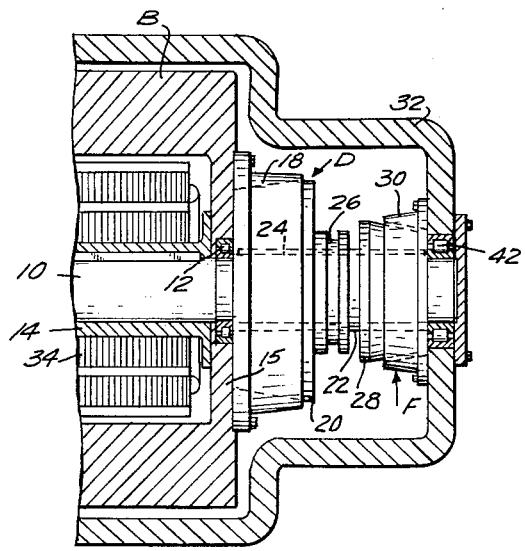

United States Patent Office 3,022,433
Patented Feb. 20, 1962

3,022,433
MOTOR-FLYWHEEL UNIT
Albino Ferranti, 19 Via Belinzaghi, Milan, Italy
Filed May 3, 1956, Ser. No. 582,515
Claims priority, application Italy Aug. 27, 1955
12 Claims. (Cl. 310—74)

This invention relates to a motor-flywheel unit for the control of working machines in general, such as, for example, machine tools.

A number of such machines, due to their own nature, are provided with flywheels, which action takes place when the full power output is to be delivered. In the machines as actually embodied, the flywheel has usually very large dimensions, and sometimes it is also used as a driving pulley, connected with the motor through a belt. This makes the design and construction of the machine very difficult and is unsatisfactory from the viewpoint of prevention of drawbacks. Fitting or overhaul of different controls is also very difficult. Moreover, a transmission from motor to driving shaft is required by the conventional machines.

The object of the invention is to provide a motor-flywheel unit having the hereinafter stated advantages: easy and quick embodiment, reduced sizes, reliable operation and removal of heretofore required driving transmission.

The inventive idea upon which the motor-flywheel unit is based, is characterized by the use of a bell-shaped flywheel, having the machine driving motor at least partly fitted therein. The flywheel is directly connected with the rotor of motor, in order to prevent arrangement of drives, and particularly belts, fitted therebetween. The aforedescribed motor-flywheel unit could be provided with clutches of the friction type, to establish a torque connection of said rotor with the machine driving shaft, in order to actuate said machine without acting on the motor. Moreover, a gearing could be fitted between the flywheel and motor shaft, in order to obtain a variable speed ratio of said components.

In order that the invention may be readily carried into effect, it will now be described with reference to the accompanying drawings, wherein:

FIGS. 2 and 3 are like sections of two different embodiments, wherein each unit is provided with an epicyclic reduction gear; and FIG. 4 is an embodiment, according to FIG. 1, of a unit provided with a coupling and braking device.

Referring now to the figures, A is the machine frame, B is the flywheel, and C is the electric motor by which the machine is driven.

Figure 1:
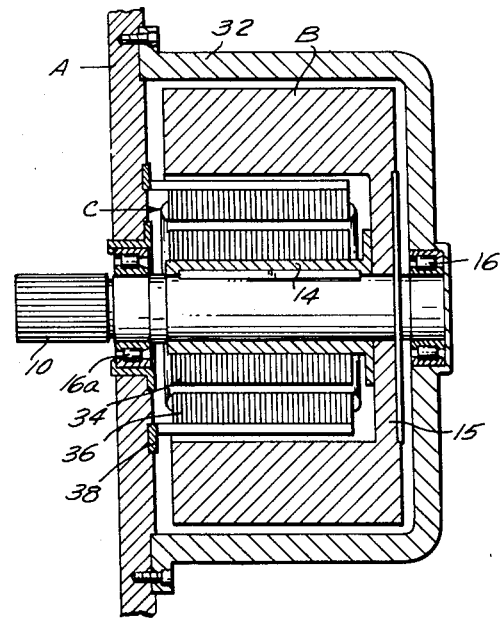
FIG. 1 is an axial section taken through the end of a machine provided with the motor-flywheel unit according to the invention.

The flywheel B is bell-shaped and in the case of FIG. 1 it is keyed on shaft 10, connected with the machine to be actuated.

A sleeve 14 is secured inside flywheel B, and more precisely to bottom wall 15 thereof. Said sleeve is keyed to shaft 10, arranged on bearings 16, being one of latter bearings fitted on a casing 32, cantilevered to, or supported in any suitable manner by, the framing A. The other bearing 16a could also be fitted on any other component of the unit (instead of being secured to frame A, as shown).

The rotor 34 of motor C is keyed on sleeve 14, and the stator is cantilevered by means of a flange 38, to one side of framing A, or casing 32.

The arrangement of having the stator mounted on the frame A and the combined rotor and fly-wheel unit freely rotatably on the driven shaft, gives new and unexpected advantages over the construction previously proposed. No precisely machined parts are necessary for this arrangement since a direct mounting of the fly-wheel rotor unit on the rotor shaft provides self-adjustment of these parts relative to each other. Furthermore a simple and sturdy construction is obtained, easily assembled and maintained.

Figure 2:
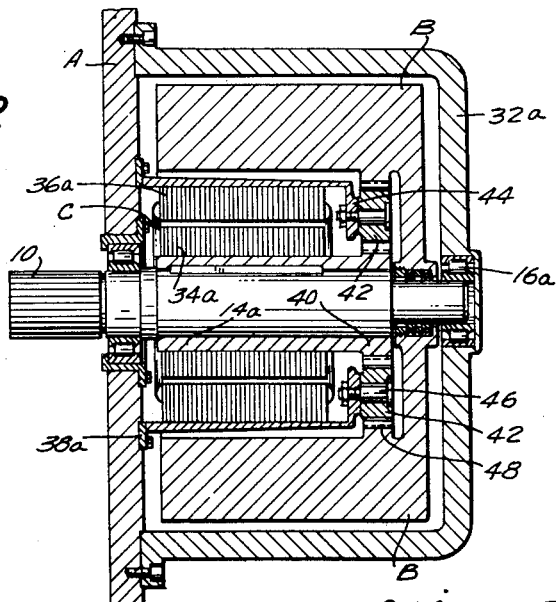

Referring now to FIG. 2, the rotor 34a is keyed on the sleeve 14a, provided on one end with a pinion 40. The pinion engages with planet wheels 42, suitably journalled on a rim 44, to which the motor stator 36a is conveniently secured, and that is cantilevered to frame A by means of the flange 38a. Said planet wheels are loose fitted on their journals 46 and engage on their turn with a ring gear 48, as cut inside flywheel B. From the aforedescribed arrangement, it follows that the flywheel B is driven at a speed different from that of motor C, according to the transmission ratio of gear train 40—42—48.

The arrangement as defined above is highly suitable for embodying motor-flywheel units, wherein a remarkable mass is shown by the flywheel, and the motor is of the high speed (i.e. high r.p.m.) type, the shaft 10 of the machine being directly actuated by the motor.

In the embodiment according to FIG. 3, the shaft 10b and the flywheel B are driven by rotor 34b of motor C through a reduction gear that comprises a pinion 40b, keyed on a sleeve 14b. The sleeve is loose fitted on the shaft 10b and is supported thereon by means of bearings 50. The motion of pinion 40b is transmitted through planet wheels 42b and a suitable ring gear 48b, to flywheel B, that is keyed on shaft 10b.

It follows that the shaft 10b is driven at a speed lower than that of the motor.

In the embodiment according to FIG. 4, a motor-flywheel unit similar to that of FIG. 1 is shown (all like components being marked with the same reference numbers), but a friction clutch D and a brake F are provided, which are inserted between the flywheel B and the driving shaft 10. According to said embodiment, the rotor 34 of motor C, keyed on sleeve 14, is loose fitted, through the bearings 16, on the shaft 10. The shaft is suitably extended and its outer end rests in a bearing 42, secured to casing 32.

The extended section of shaft 10 is provided with a key 24 to set a torsional connection between said shaft and a bushing 22, slidingly threaded thereon. The bushing 22 is provided with a grooved collar 26, wherein a control fork (not shown) engages, in order to have said collar, together with its bushing, moved along the shaft 10. The bushing 22 ends with a cone 20 and the opposite end thereof is formed with a countercone 28. The cone 20 frictionally engages with a collar 18, as secured outside flywheel B. Thus, a friction clutch is formed by the latter two components. Cooperation of the countercone 28 with a countercollar 30, secured to casing 32 takes place, whereby a braking unit is formed by the latter two components. It follows that, after the motor is started, the rotor 34 will drive the flywheel B. The flywheel B can engage with the shaft 10, upon the throwing of the clutch 20 in, i.e. by moving the collar 26 with its cone 20 into engagement with the collar 18.

When the aforedescribed friction clutch is released, the flywheel B is no longer connected to the shaft 10. Further motion of collar 26 to the right causes the countercone 28 to engage with the countercollar 30, whereby braking of the shaft 10 (and thus also of all the components connected thereto) takes place.

Thus, according to this invention, the shaft 10 can be braked independently from the flywheel B.

It follows that, in the case of a number of machine tools, such as, for example, shears, presses or the like, the flywheel B can be brought again by the motor up to the maximum allowable speed, whereby when the shaft 10 is again engaged a maximum torque will be available.

Alterations and changes could be made in the aforedescribed and illustrated unit while carrying it into practice. Thus, for example the planet wheels 44 could be associated with braking devices, being thereby allowed to accomplish a rotary motion around the axis of shaft 10.

The terms "rotor" and "stator," as referred to motor C, are to be considered in their relative meaning, i.e. the outer section of said motor could act as rotor, being thus keyed to flywheel B, while the inside section, acting as stator, will be secured to the frame A, or to any suitable stationary element of the machine.

What I claim is:

1. In an electric machine, in combination, support means; shaft means mounted on said support means for rotation about an axis; a flywheel mounted on said shaft means for rotation relative thereto about said axis; electric machine means including stator and rotor components located radially adjacent said shaft means throughout at least part of its length, said stator component being fixedly secured to said support means and encompassing said rotor component and said rotor component being freely rotatable on said shaft means; motion transmitting means connecting said rotor component to said flywheel for rotation therewith; coupling means operable for uncoupling and coupling said shaft means to said flywheel and said rotor component; and a stationary housing secured to said support means and encompassing said flywheel.

2. In an electric machine, in combination, support means; shaft means mounted on said support means for rotation about an axis; a substantially cup-shaped flywheel also rotatable about said axis; electric machine means including stator and rotor components arranged along at least part of their lengths within said flywheel and encompassing said shaft means throughout at least part of its length, said stator component being fixedly secured to said support means and encompassing said rotor component; and planetary gear means interconnecting said rotor component and said flywheel.

3. In an electric machine, in combination, support means; shaft means mounted on said support means for rotation about an axis; a substantially cup-shaped flywheel mounted on said shaft means for rotation relative thereto about said axis; electric machine means including stator and rotor components arranged along at least part of their lengths within said flywheel and encompassing said shaft means throughout at least part of its length, said stator component being fixedly secured to said support means and encompassing said rotor component; and planetary gear means interconnecting said rotor component and said flywheel.

4. In an electric machine, in combination, support means; shaft means mounted on said support means for rotation about an axis; a substantially cup-shaped flywheel mounted on said shaft means for rotation relative thereto about said axis; electric machine means including stator and rotor components arranged along at least part of their lengths within said flywheel and encompassing said shaft means throughout at least part of its length, said stator component being fixedly secured to said support means and encompassing said rotor component; and planetary gear means interconnecting said rotor component and said flywheel, said planetary gear means including a sun gear carried by said shaft means, at least one pinion gear meshing with said sun gear and rotatable about an axis parallel to said first-mentioned axis and an annular gear on said flywheel meshing with said pinion gear.

5. The combination defined in claim 4, and common mounting means for mounting said stator component and said pinion gear on said support means.

6. In an electric machine, in combination, support means; shaft means mounted on said support means for rotation about an axis; a substantially cup-shaped flywheel mounted on said shaft means for rotation therewith about said axis; electric machine means including stator and rotor components arranged along at least part of their lengths within said flywheel and encompassing said shaft means throughout at least part of its length, said stator component being fixedly secured to said support means and encompassing said rotor component and said rotor component being mounted on said shaft means for rotation relative thereto about said axis; and planetary gear means interconnecting said rotor component and said flywheel.

7. In an electric machine, in combination, support means; shaft means mounted on said support means for rotation about an axis; a substantially cup-shaped flywheel mounted on said shaft means for rotation therewith about said axis; electric machine means including stator and rotor components arranged along at least part of their lengths within said flywheel and encompassing said shaft means throughout at least part of its length, said stator component being fixedly secured to said support means and encompassing said rotor component and said rotor component being mounted on said shaft means for rotation relative thereto about said axis; and planetary gear means interconnecting said rotor component and said flywheel, said planetary gear means including a sun gear carried by said rotor component, at least one pinion gear meshing with said sun gear and rotatable about an axis parallel to said first-mentioned axis, and an annular gear on said flywheel and meshing with said pinion gear.

8. The combination defined in claim 7, and common mounting means for mounting said stator component and said pinion gear on said support means.

9. In an electric machine, in combination, support means; shaft means mounted on said support means for rotation about an axis; a substantially cup-shaped flywheel mounted on said shaft means for rotation relative thereto about said axis; electric machine means including stator and rotor components arranged along at least part of their lengths within said flywheel and encompassing said shaft means throughout at least part of its length, said stator component being fixedly secured to said support means and encompassing said rotor component; connecting means for connecting said rotor component to said shaft means for rotation therewith; motion transmitting means operatively connecting said rotor component to said flywheel for rotation therewith; and a stationary housing secured to said support means and encompassing said flywheel.

10. In an electric machine, in combination, support means; shaft means mounted on said support means for rotation about an axis; a flywheel mounted on said shaft means for rotation relative thereto about said axis; electric machine means including stator and rotor components encompassing said shaft means throughout at least part of its length, said stator component being fixedly secured to said support means and encompassing said rotor component and said rotor component being freely rotatable on said shaft means; motion transmitting means connecting said rotor component to said flywheel for rotation therewith; stationary braking means axially spaced from said flywheel; a coupling member axially movable on said shaft means in one direction to connect said shaft means to said flywheel for joint rotation and movable in the opposite direction to disconnect the flywheel from the shaft means and into cooperative engagement with said stationary braking means to stop rotation of the shaft means independent of the rotation of the flywheel and of said rotor component; and a stationary housing secured to said support means and encompassing said flywheel.

11. In an electric machine, in combination, support means; shaft means mounted on said support means for rotation about an axis; a flywheel mounted on said shaft means for rotation relative thereto about said axis; electric machine means including stator and rotor components encompassing said shaft means throughout at least part of its length, said stator component being fixedly secured to said support means and encompassing said rotor component and said rotor component being freely rotatable on said shaft means; motion transmitting means connecting said rotor component to said flywheel for rotation therewith; combined coupling and braking means cooperatively associated with said shaft means and said flywheel comprising an operating member movable in one direction to connect said shaft means to said flywheel for joint rotation and movable in the opposite direction to disconnect the flywheel from the shaft means and to effect braking and stoppage of rotation of said shaft means independent of the rotation of the flywheel and of said rotor component; and a stationary housing secured to said support means and encompassing said flywheel.

12. In an electric machine, in combination, support means; shaft means mounted on said support means for rotation about an axis; a flywheel mounted on said shaft means for rotation relative thereto about said axis; electric machine means including stator and rotor components encompassing said shaft means throughout at least part of its length, said stator component being fixedly secured to said support means and encompassing said rotor component and said rotor component being freely rotatable on said shaft means; motion transmitting means connecting said rotor component to said flywheel for rotation therewith; a clutch member connected to said flywheel coaxially therewith; a stationary brake member axially spaced from said clutch member; a slide member having a clutch portion at one end and a brake portion at the opposite end axially movable in one direction to effect operative interengagement of said clutch portion and said clutch member for joint rotation of said flywheel and said shaft means and movable in the opposite direction to disconnect the flywheel to effect interengagement of said brake portion and said brake member to stop rotation of the shaft means independent of the rotation of the flywheel and of said rotor component; and a stationary housing secured to said support means and encompassing said flywheel.

References Cited in the file of this patent

UNITED STATES PATENTS

| | | |
|---|---|---|
| 1,688,825 | Mills | Oct. 23, 1928 |
| 1,780,338 | Canton | Nov. 4, 1930 |
| 1,875,763 | Robinson | Sept. 6, 1932 |
| 1,936,737 | Tingley | Nov. 28, 1933 |
| 2,293,311 | Schuchardt | Aug. 18, 1942 |
| 2,422,120 | Noble | June 10, 1947 |
| 2,432,383 | Colwell | Dec. 8, 1947 |
| 2,510,917 | Turner et al. | June 6, 1950 |
| 2,624,856 | Younger | Jan. 6, 1953 |

FOREIGN PATENTS

| | | |
|---|---|---|
| 873,816 | France | Apr. 7, 1942 |